ULTRAHIGH-FREQUENCY COUPLING DEVICE

Filed Oct. 22, 1946

Inventor
Louis Malter &
John L. Moll

By
William A. Zalesak
Attorney

Patented Nov. 27, 1951

2,576,186

UNITED STATES PATENT OFFICE 2,576,186

ULTRAHIGH-FREQUENCY COUPLING DEVICE

Louis Malter, Washington, D. C., and John L. Moll, Columbus, Ohio, assignors to Radio Corporation of America, a corporation of Delaware Application October 22, 1946, Serial No. 704,876

5 Claims. (Cl. 178—44)

This invention relates to devices employed in the generation and transmission of ultra-high frequency power and more particularly to component elements of transmission lines including wave-guides.

Radio frequency energy at very high frequencies is generally expressed or identified in wavelength which is measured in centimeters or fractions thereof. Waves of such short wave-length are generally referred to as micro waves.

In micro wave technique cavity resonators and transmission lines in various shapes and forms are the component circuit elements. These elements must have exact physical dimensions related to the wave-length in order to function effectively for energy transfer. It is often necessary also to couple these circuit elements in order to transmit energy from one to the other. Efficient coupling requires careful matching of the impedances that these circuit elements possess. For example, in a generator for micro wave energy, such as a magnetron, the impedance of the resonant cavity must be matched to the impedance of the output circuit which may be a transmission line, a wave guide, or another resonant cavity.

The object of the invention is to improve the physical structure of circuit component elements operating at ultra-high frequencies, particularly coupling devices.

Another object of the invention is to facilitate the matching of impedances in ultra-high frequency circuits.

A further object of the invention is to facilitate the matching of a resonator to a transmission line.

A particular object of the invention is to improve the structure of magnetron oscillators facilitating the coupling of their energy to an output circuit.

A particular advantage resulting from the practice of the invention is that the physical structure of component elements may be altered at will within practical limits without sacrificing efficiency of energy transfer.

Another advantage of the invention is that the impedance of existing structures may be modified to suit particular needs without changing the physical dimensions.

Figures 1, 1A:
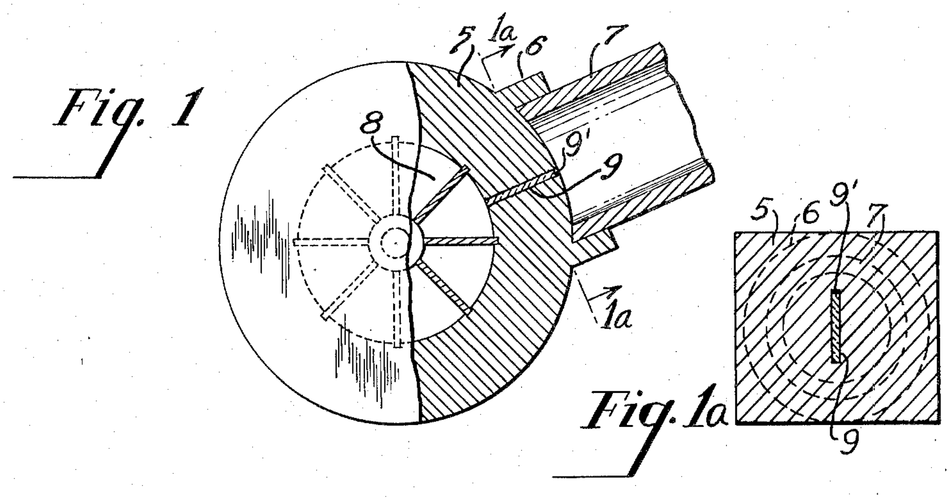
Figure 2:
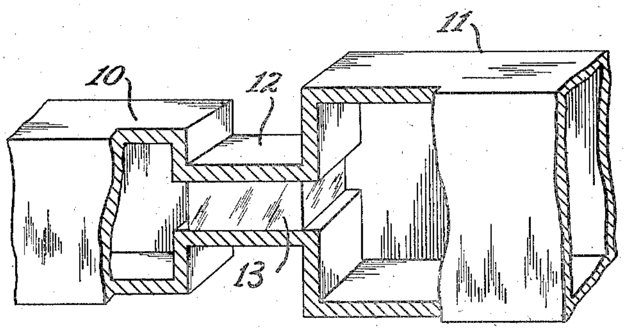
Figure 3:
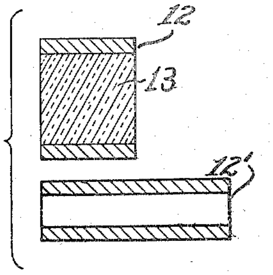

Other objects and advantages will be apparent from the following description of the invention, pointed out in particularity in the appended claims and taken in connection with the accompanying drawing in which Fig. 1 shows the application of the invention to a magnetron for coupling its energy into a wave-guide; Fig. 1A is a cross-section taken along line 1*a*—1*a* of Fig. 1. Fig. 2 shows in perspective view a coupling device in accordance with the invention used between two rectangular wave-guides of different electrical and physical characteristics; Fig. 3 illustrates the particular advantages in physical size of a quarter wave transmission line constructed in accordance with the invention compared to a quarter wave line of conventional design.

In guiding ultra-high frequency energy, transmission lines are utilized which may have a variety of forms. The surfaces presented by these lines determine the path of wave propagation. Any conducting surface may be utilized and in practice it is customary to use spaced conductors such as wires or conducting planes. The latter may be built into various physical shapes having circular or rectangular cross-sections and may be closed on all sides. All transmission lines in whatever form possess a characteristic impedance which is determined by the geometry of the physical structure and particularly by the spacing between the conducting surfaces and the dielectric medium therebetween.

In order to transmit power between transmission lines or similar ultra-high frequency component elements having different characteristic impedances, it is customary to use as a coupling medium a section of transmission line of a quarter wave-length. A line used for such purposes is known as a quarter wave matching section or a quarter wave transformer. The physical dimensions of such a section is largely determined by the wave-length to be transmitted.

In certain applications, particularly when a cavity of the magnetron is to be coupled to a wave-guide, the dimensions of the matching section are extremely critical. If the width of this section is too large, the external load will unduly affect the frequency of the ultra-high frequency power generated. On the other hand, if the width is too small, not enough power will be coupled into the external load.

In practice, particularly at ultra-high frequencies working with waves less than 1 cm. long, the width of the matching section is so small that the problem of machining parts and assembly of the tube is extremely difficult.

The coupling of a magnetron to an output load circuit by means of a wave-guide is shown in Fig. 1. The magnetron 5 has a flange 6 in which the circular wave-guide 7 is closely fitted. The output energy from one of the cavities 8 is transmitted through a slot 9 which is cut into the body of the magnetron. The dimensions of the slot 9 must be carefully calculated in order to match the internal impedance of the magnetron to that of the characteristic impedance of the wave-guide 7. The physical length of the matching section 9 must result in an electrical length of one-quarter of the wave-length and the width of the slot 9 must be of such dimensions that the impedance of the matching section will properly match the two impedances aforementioned. The matching section impedance is generally equal to the square root of the product of the two impedances to be matched.

The difficulty of maintaining small tolerances for a matching section of the type shown in Fig. 1 can best be illustrated by the following example. Operating at a wave-length of 1.25 cms., the length of the slot is about .31 cm., whereas the width of the slot is only .028 cm. It will be understood that the depth of the slot, perpendicular to the plane of Fig. 1, must be greater than one-half wavelength, the cut-off limit. To maintain such small dimensions with satisfactory tolerances requires very careful and difficult machining operations.

The above dimensions for the quarter wave coupling section indicated by the slot 9 of the magnetron have been calculated considering normally that a vacuum dielectric exists between the conducting surfaces. It is proposed, in accordance with the invention, to utilize some solid dielectric medium 9′ having a dielectric constant greater than unity such as quartz, glass, ceramics or Lucite. These dielectrics may fill the entire cavity of the matching section or a portion thereof, as the case may be. In the examples shown in the drawings, quartz was chosen as the solid dielectric medium merely for the purpose of illustration.

Referring to the above example given for the physical dimensions of a quarter wave matching section in the magnetron, when quartz is used as the solid dielectric having a dielectric constant 3.9 times that of vacuum, the width of the quarter wave section is .083 cm. This is approximately three times the previous dimension. The length of the section is also decreased from .31 cm. to .166 cm., a decrease of approximately one-half the original length. Each of these changes is very desirable from a mechanical standpoint, particularly the increase in width which simplifies the mechanical problem of machining a transformer of given width, which, as stated before, is a difficult problem. By the use of other solid dielectric mediums than quartz the width and the length of matching sections may be correspondingly altered to conform to design requirements. It was found that the physical length of the matching section for a given wavelength varies approximately as the reciprocal of the square root of the dielectric constant of the material and the spacing between conducting surfaces varies approximately as the square root of the dielectric constant of the material. Physically, the reasons for this lie in the fact that the effective wave-length in the dielectric material varies as the reciprocal of the square root of its dielectric constant and the characteristic impedance for a given dielectric constant varies with the spacing between two conducting surfaces and for a given spacing varies approximately as the reciprocal of the square root of the dielectric constant.

The application of the invention to the coupling of two rectangular wave-guides is shown in Fig. 2 wherein the guide 10 of a certain characteristic impedance is to be matched to the guide 11 of a different characteristic impedance. The matching section 12 between the lines has a solid dielectric material 13 which may be quartz, as shown between the two conducting surfaces.

The advantage in physical structure gained by the use of quartz dielectric 13 as an example is illustrated in Fig. 3 in which the dimensions of the quartz dielectric matching section 12 are drawn in proportion to an equivalent air (or vacuum) dielectric section 12′. It is seen that the spacing between the conducting surfaces of section 12 is approximately three times wider than that of the section 12′, whereas the length of the former is approximately one-half of the latter.

From the above examples it is seen that a solid dielectric insert is an effective means for obtaining advantageously the physical dimensions of circuit elements. In this connection it is pointed out that existing physical dimensions may also be advantageously used to perform various impedance matchings by simply inserting a dielectric material of such proportions as to obtain a desired electrical dimension, that is, a desired impedance.

We claim:

1. An ultra-high frequency radio energy circuit operating at a particular wavelength including as elements a resonator enclosing an evacuated space and having a metallic wall portion and a certain impedance, a slot in said wall portion, solid dielectric filling said slot in hermetically sealed relationship to maintain the vacuum in said resonator, a waveguide having an impedance different from that of said resonator and terminating at said wall portion and having a dielectric under some pressure relative to said evacuated space, said slot being in energy communicating relationship between said space and said waveguide, said dielectric filled slot having a characteristic impedance equal to the square root of the product of the waveguide and resonator impedances and having an electrical length of a quarter of said operating wavelength and a physical length equal to the thickness of said wall portion.

2. A circuit for high frequency radio energy and having a particular operating frequency, comprising a circuit element having an evacuated space, a metallic wall portion and a first impedance, a hollow pipe air-filled waveguide having a second impedance and terminating at said wall portion on the outside thereof, a slot, solid dielectric filling said slot and hermetically sealing the slot, said slot being in energy communicating relationship between said space and the air-filled portion of said pipe, said dielectric filled slot having an electrical length of one quarter of a wavelength at said operating frequency and a physical length equal to the thickness of said wall portion and having a characteristic impedance equal to the geometric mean between said first and second impedance.

3. The circuit claimed in claim 1, including a magnetron, of which said resonator is a part, said waveguide being an air-filled hollow pipe waveguide.

4. The circuit claimed in claim 3, said solid dielectric being quartz.

5. The circuit claimed in claim 1, said slot being entirely filled with said solid dielectric.

LOUIS MALTER.
JOHN L. MOLL.

(References on following page)

REFERENCES CITED

The following references are of record in the file of this patent:

UNITED STATES PATENTS

| Number | Name | Date |
|---|---|---|
| 2,200,023 | Dallenbach | May 7, 1940 |
| 2,376,785 | Krasik | May 22, 1945 |
| 2,408,745 | Espley | Oct. 8, 1946 |
| 2,409,913 | Tonks | Oct. 22, 1946 |
| 2,411,534 | Fox | Nov. 26, 1946 |
| 2,413,171 | Clifford | Dec. 24, 1946 |
| 2,421,912 | Spooner | June 10, 1947 |
| 2,432,094 | Fox | Dec. 9, 1947 |
| 2,489,131 | Hegbar | Nov. 22, 1949 |

OTHER REFERENCES

Microwave Transmission Data Published May 1944 (copy in Div. 69), (published by Sperry Gyroscope, Manhattan Bridge Plaza, Brooklyn, New York), see Chapter VIII.